(12) United States Patent
Arvanitis, Jr. et al.

(10) Patent No.: US 6,293,042 B1
(45) Date of Patent: Sep. 25, 2001

(54) DETACHABLE WINGS FOR DECOY

(76) Inventors: C. Mike Arvanitis, Jr.; Jerome Helget, both of 248 E. 1st St., Fremont, NE (US) 68025

( * ) Notice: Subject to any disclaimer, the term of this patent is extended or adjusted under 35 U.S.C. 154(b) by 0 days.

(21) Appl. No.: 09/421,100

(22) Filed: Oct. 19, 1999

Related U.S. Application Data

(60) Provisional application No. 60/105,051, filed on Oct. 21, 1998.

(51) Int. Cl.$^7$ ................................................ A01M 31/06
(52) U.S. Cl. ........................................................... 43/3
(58) Field of Search ............................................. 43/2, 3

(56) References Cited

U.S. PATENT DOCUMENTS 3,768,192 * 10/1973 Caccamo ..................................... 43/3
5,191,730 * 3/1993 Balmer ....................................... 43/3
5,231,780 * 8/1993 Gazalski .................................... 43/3

* cited by examiner

*Primary Examiner*—Kurt Rowan
(74) *Attorney, Agent, or Firm*—Koley Jessen P.C.; Mark D. Frederiksen

(57) ABSTRACT

Decoy wings include a connector with a central hub and arms projecting forwardly, rearwardly, and out the opposing sides thereof. The connector is removably connected to a decoy body with a pair of elastic bands encircling the body and engaging the forward and rearward arms of the connector. Each decoy wing includes a frame member with a hook portion on the inward end which will engage a hook-shaped channel formed in the bottom of the connector hub and side arms. A flexible fabric sheet is connected to each frame member to provide an animated appearance to the decoy.

14 Claims, 3 Drawing Sheets

DETACHABLE WINGS FOR DECOY

CROSS-REFERENCES TO RELATED APPLICATIONS

This application claims the benefit of U.S. Provisional Application Ser. No. 60/105,051, filed Oct. 21, 1998.

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to bird decoys use for hunting and the like, and more particularly to an improved set of wings which are removably connected to a decoy body.

(2) Background Information

An important aspect of duck and goose hunting is the use of lifelike decoys to draw birds to the hunter's location. Many types of decoys have been used in the past from hand carved devices to photographic images mounted on board.

One problem with most previous decoy designs was the inability to depict an animated or lifelike feature to the decoy. Attempts to animate decoys have only been partially successful. Typically, carved wings or the like are mechanically connected to a decoy body and then oscillated or moved in some mechanical fashion.

Most mechanical devices are relatively expensive, require the purchase of an entire decoy, including body and wings, and require a renewable power source. All of these features are drawbacks, where a decoy is used far from power sources or facilities for the repair of damaged or broken decoys. Similarly, wings from one decoy cannot typically be removed and attached to other decoy bodies, necessitating the replacement of the entire structure if damaged.

BRIEF SUMMARY OF THE INVENTION

It is therefore a general object of the present invention to provide an improved set of decoy wings for a decoy body.

Another object is to provide improved decoy wings which may be easily attached and detached from a decoy body.

A further object of the present invention is to provide decoy wings which are animated in appearance without requiring a motor or other powered actuator.

These and other objects of the present invention will be apparent to those skilled in the art.

The decoy wings of the present invention include a connector with a central hub and arms projecting forwardly, rearwardly, and out the opposing sides thereof. The connector is removably connected to a decoy body with a pair of elastic bands encircling the body and engaging the forward and rearward arms of the connector. Each decoy wing includes a frame member with a hook portion on the inward end which will engage a hook-shaped channel formed in the bottom of the connector hub and side arms. A flexible fabric sheet is connected to each frame member to provide an animated appearance to the decoy.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
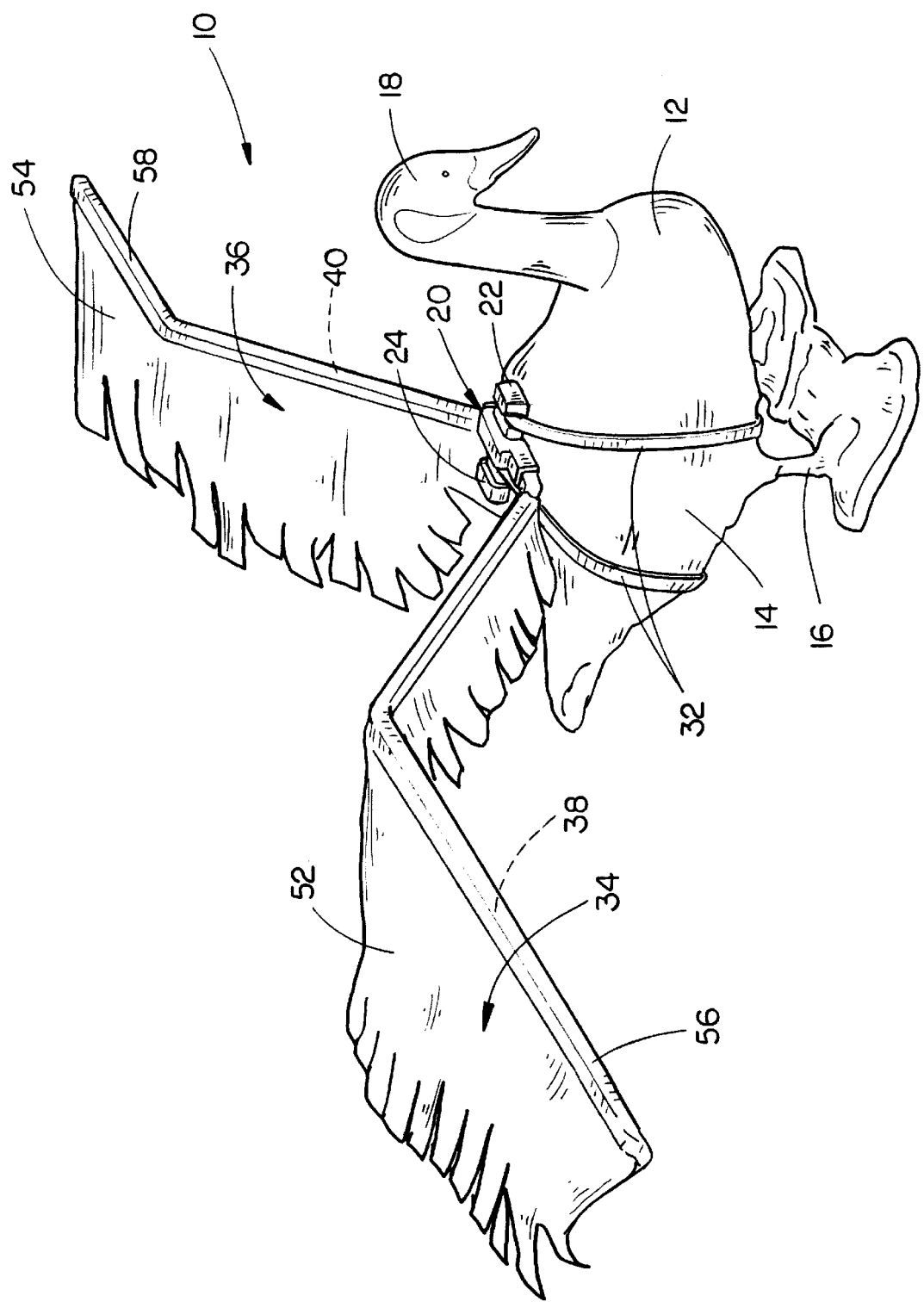
FIG. 1 is a perspective view of the wings of the present invention connected to a decoy body.

Referring now to the drawings, and more particularly to FIG. 1, the decoy wings of the present invention are designated generally at 10 and are shown attached to a duck decoy 12. Decoy 12 includes a body 14 with feet 16 mounted on the lower end, and head 18 mounted on an upper forward end thereof.

Figure 2:
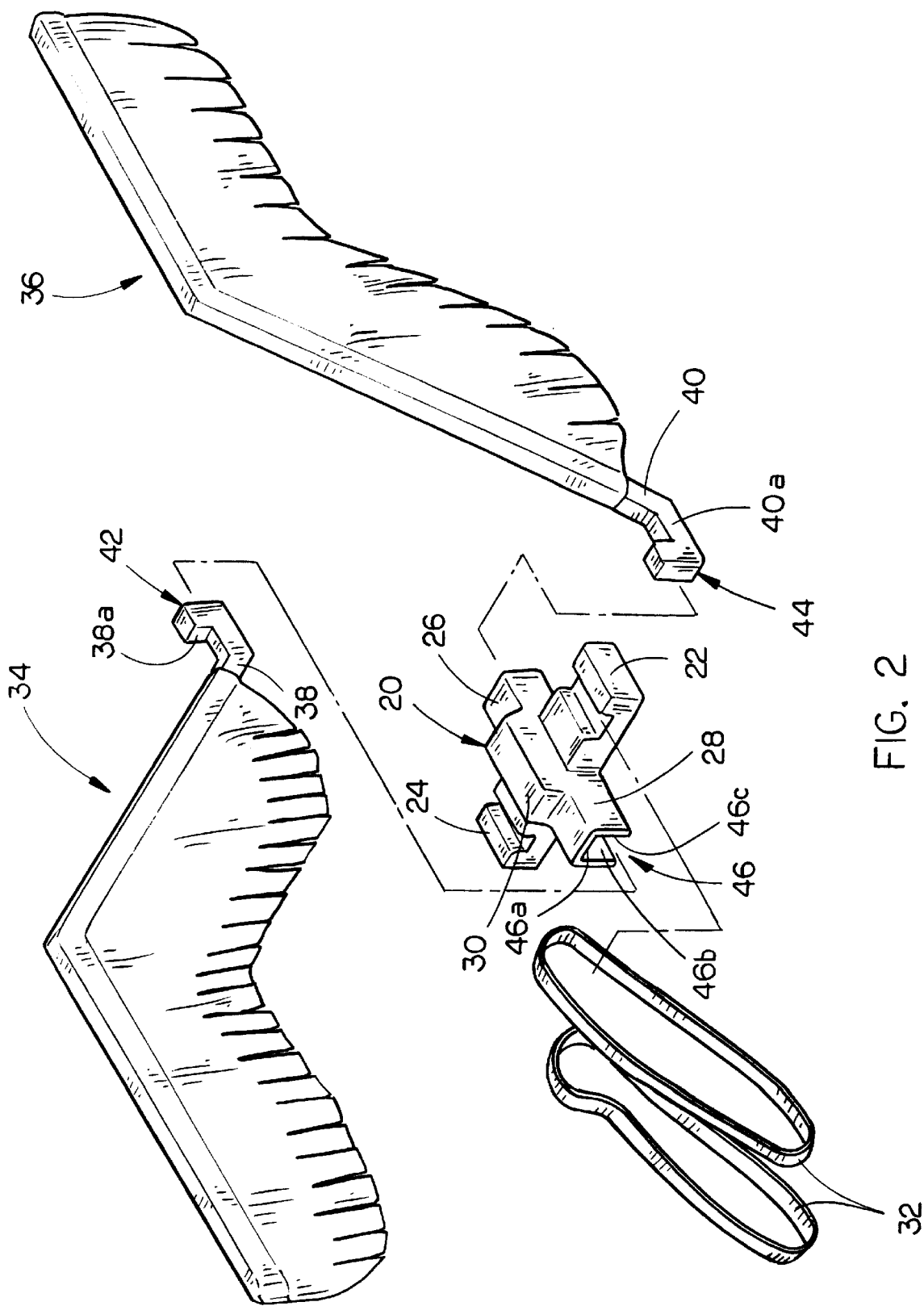
FIG. 2 is an exploded perspective view of the invention.

Referring now to FIG. 2, the decoy wings 10 of the present invention include a connector 20 with forward and rearward projecting arms 22 and 24, and a pair of opposing side arms 26 and 28, all projecting from a central hub 30. Connector 20 is removably attached to the decoy body 14 with a pair of elastic bands 32. Bands 32 are stretched around the decoy body 14 and over the upper surface of forward and rearward arms 22 and 24, to bias connector 20 into engagement with the upper surface of decoy body 14, as shown in FIG. 1. Preferably, one band 32 extends around decoy body 14 forwardly of feet 16, and one band extends around body 14 rearwardly of feet 16.

Decoy wings 10 include a pair of individual wings 34 and 36, each wing having an elongated rigid frame member 38 and 40 respectively. Each frame member 38 and 40 includes an inward end 38a and 40a respectively connected to connector 20. Frame member inward ends 38a and 40a include a hook portion 42 and 44 respectively which will engage the connector 20 as described in more detail hereinbelow.

Connector 20 includes a channel 46 which opens downwardly and extends through side arm 26, hub 30, and side arm 28. Channel 46 includes a ceiling 46a and opposing vertical side walls 46b and 46c. The ceiling 46a of channel 46 within hub 30 is raised vertically relative to the ceilings of side arms 26 and 28 to form a pair of opposing hook-shaped channels 48 and 50 shaped to receive the hook-shaped ends 42 and 44 of frame members 38 and 40.

Figure 3:
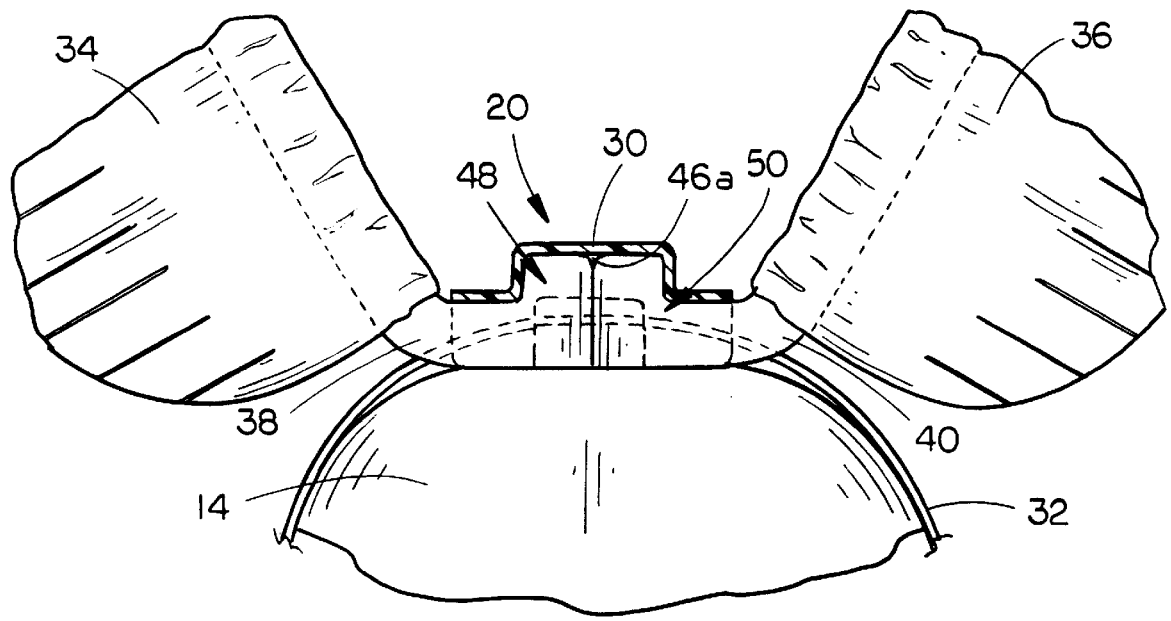
FIG. 3 is a sectional view through the connector body of the invention showing the attachment of the wings to the decoy.
Figure 4:
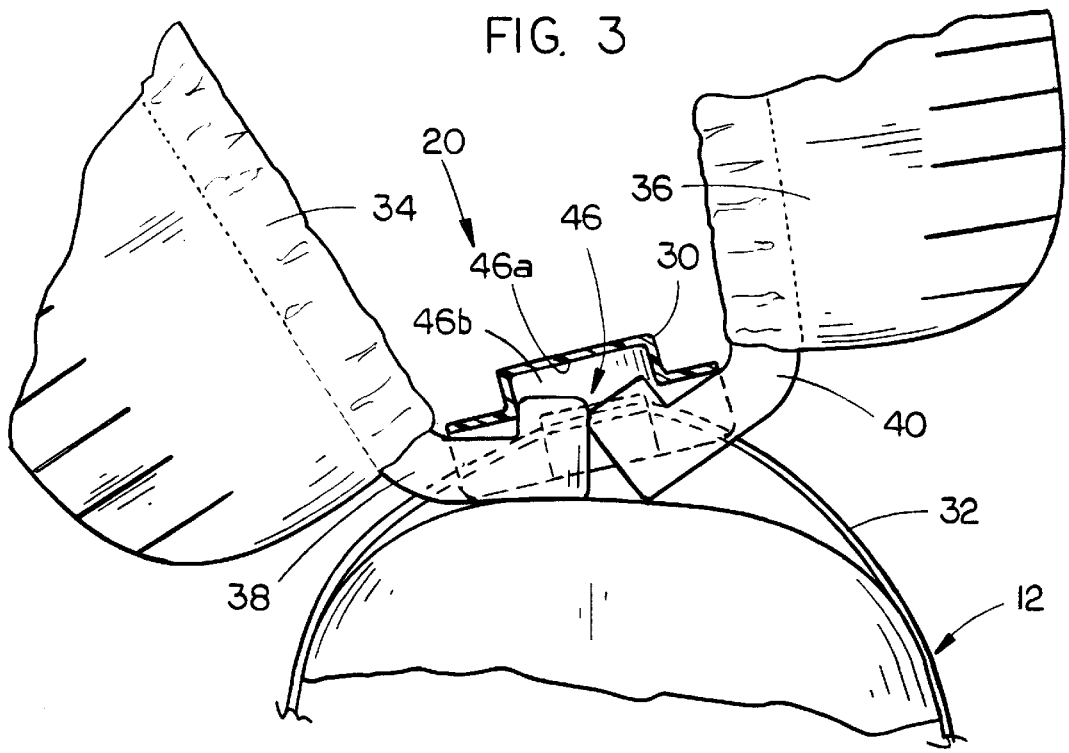
FIG. 4 is a view similar to FIG. 3, but with one wing pivoted for removal from the connect.

As shown in FIGS. 3 and 4, elastic bands 32 permit connector 20 to be pivoted away from decoy body 14 to allow insertion and removal of the decoy wings 34 and 36.

Referring once again to FIG. 1, each wing 34 and 36 includes a soft flexible sheet 52 and 54 respectively, formed in the shape of a feathered bird wing and attached to their respective frame members 38 and 40. Each sheet 52 and 54 includes a sleeve 56 and 58 respectively formed along a forward edge of the sheet to receive the respective frame member 38 and 40 therein. Each sheet 52 and 54 may thereby be easily attached to the associated frame members 38 and 40 by sliding the sleeves 56 and 58 over the associated frame member until fully engaged thereon. The flexible fabric of the sheet will move in the wind, providing animated features to decoy 10.

Whereas the invention has been shown and described in connection with the preferred embodiment thereof, many modifications, substitutions and additions may be made which are within the intended broad scope of the appended claims.

We claim:

1. In combination:
   a decoy representing a bird, including a body, a head on a forward end of the body, legs depending from a lower end of the body, and the body having opposing sides, an upper end, and a rearward end;
   a connector removably connected to the upper end of the body;
   first and second wings having inward ends connected to the connector and outward ends projecting outwardly from the body;
   at least one band connecting the connector to the body, said band encircling the body of the decoy and engaging the connector to retain it in position on the body;
   said band being elastic in a longitudinal direction and extending over the top of the connector to bias the connector into engagement with the decoy body;
   said connector including a central hub with a forward arm projecting forwardly therefrom, a rearward arm projecting rearwardly from the hub, and a pair of first and second side arms projecting from opposing sides of the hub; and
   a second elongated elastic band, the bands encircling the body with one band located over the top of the forward arm and the other band located over the top of the rearward arm.

2. The combination of claim 1, wherein:
   said first wing includes an elongated frame member having inward and outward ends, the inward end connected to said connector; and
   the second wing includes an elongated frame member having inward and outward ends, the inward end connected to said connector.

3. The combination of claim 2, wherein each said wing frame member inward end includes a hook portion, and wherein the connector includes hook receiving channels for selectively receiving said hook portions.

4. The combination of claim 3, wherein said connector hub and side arms include an elongated downwardly opening channel, said channel including a ceiling and opposing side walls and extending through the first side arm, the hub, and the second side arm, said hub ceiling raised vertically relative to the side arm ceilings, to form a pair of opposing hook-shaped channels shaped to receive the hook portions of the frame members therein.

5. The combination of claim 4, wherein each wing includes a soft flexible sheet formed in the shape of a feathered bird wing attached to each frame member.

6. The combination of claim 5, wherein each sheet includes a sleeve formed along a forward edge, each frame member journaled into the sleeve of the associated sheet to retain the sheet thereon.

7. In combination:
   a decoy representing a bird, including a body, a head on a forward end of the body, legs depending from a lower end of the body, and the body having opposing sides, an upper end, and a rearward end;
   a connector removably connected to the upper end of the body;
   first and second wings having inward ends connected to the connector and outward ends projecting outwardly from the body;
   said connector including a central hub with a forward arm projecting forwardly therefrom, a rearward arm projecting rearwardly from the hub, and a pair of first and second side arms projecting from opposing sides of the hub, and further comprising:
      a first elongated elastic band encircling the body and engaging a top surface of the forward arm to retain the arm in position on the body; and
      a second elongated elastic band encircling the body and engaging a top surface of the rearward arm to retain the rearward arm in position on the body.

8. The combination of claim 7:
   wherein said first wing includes an elongated frame member with inward and outward ends and a hook portion formed on the inward end;
   wherein said second wing includes an elongated frame member with inward and outward ends and a hook portion formed on the inward end; and
   wherein said connector hub and side arms include a downwardly opening channel, said channel including a ceiling and opposing side walls and extending through the first side arm, the hub, and the second side arm, said hub ceiling raised vertically relative to the side arm ceilings, to form a pair of opposing hook-shaped channels shaped to receive the hook portions therein.

9. The combination of claim 8, wherein each wing includes a soft flexible sheet formed in the shape of a feathered bird wing attached to each frame member.

10. The combination of claim 9, wherein each sheet includes a sleeve formed along a forward edge, each frame member journaled into the sleeve of the associated sheet to retain the sheet thereon.

11. Detachable decoy wings for a decoy body, comprising:
    first and second decoy wings, each having inward and outward ends;
    a connector for detachably connecting the wings of a decoy body, said wings removably connected to the connector; and
    means for removably connecting the wings and connector to the decoy body; said connector including a central hub with a forward arm projecting forwardly therefrom, a rearward arm projecting rearwardly from the hub, and a pair of first and second side arms projecting from opposing sides of the hub, and wherein said means for removably connecting the wings and connector to the decoy body includes:
       a first elongated elastic band encircling the body and engaging a top surface of the forward arm to retain the arm in position on the body; and
       a second elongated elastic band encircling the body and engaging a top surface of the rearward arm to retain the rearward arm in position on the body.

12. The combination of claim 11:
    wherein said first wing includes an elongated frame member with inward and outward ends and a hook portion formed on the inward end;
    wherein said second wing includes an elongated frame member with inward and outward ends and a hook portion formed on the inward end; and
    wherein said connector hub and side arms include a downwardly opening channel, said channel including a ceiling and opposing side walls and extending through the first side arm, the hub, and the second side arm, said hub ceiling raised vertically relative to the side arm ceilings, to form a pair of opposing hook-shaped channels shaped to receive the hook portions therein.

13. The combination of claim 12, wherein each wing includes a soft flexible sheet formed in the shape of a feathered bird wing attached to each frame member.

14. The combination of claim 13, wherein each sheet includes a sleeve formed along a forward edge, each frame member journaled into the sleeve of the associated sheet to retain the sheet thereon.

* * * * *